US005381991A

United States Patent [19]

Stocker

[11] Patent Number: 5,381,991

[45] Date of Patent: Jan. 17, 1995

[54] SUSPENDED DISPLAY HOLDER

[75] Inventor: Harold L. Stocker, Chicago, Ill.

[73] Assignee: Sign-Up, Inc., Bartlett, Ill.

[21] Appl. No.: 237,238

[22] Filed: May 2, 1994

Related U.S. Application Data

[63] Continuation of Ser. No. 839,574, Feb. 21, 1992, abandoned.

[51] Int. Cl.[6] .............................................. F16M 13/00

[52] U.S. Cl. .................................. 248/206.5; 40/600; 40/617; 248/320; 248/324

[58] Field of Search ............... 248/285, 317, 320, 324, 248/343, 206.5, 489, 495, 323; 40/600, 617; 52/38, 39

[56] References Cited

U.S. PATENT DOCUMENTS

| | | | |
|---|---|---|---|
| 3,350,045 | 10/1967 | Mayers | 248/206.5 X |
| 3,984,931 | 10/1976 | Belokin, Jr. | 40/600 X |
| 4,223,488 | 9/1980 | Schoenung | 248/343 X |
| 4,257,342 | 3/1981 | Ditto | 40/600 X |
| 4,392,316 | 7/1983 | Thomas | 248/489 X |
| 4,564,165 | 1/1986 | Grant et al. | 248/343 |
| 4,901,456 | 2/1990 | Cotutsca | 40/617 X |
| 5,188,332 | 2/1993 | Callas | 248/206.5 X |

*Primary Examiner*—Ramon O. Ramirez
*Assistant Examiner*—Derek J. Berger
*Attorney, Agent, or Firm*—Leydig, Voit & Mayer, Ltd.

[57] ABSTRACT

A suspended display holder is provided for securing a display to a base with magnetic attraction. The holder includes an elongate support unit which subtends the base, a magnet unit provided on the support unit and in selective magnetic engagement with the base, and a removable hanger assembly mounted on the support unit and supportingly engaging a display.

9 Claims, 3 Drawing Sheets

FIG. 3
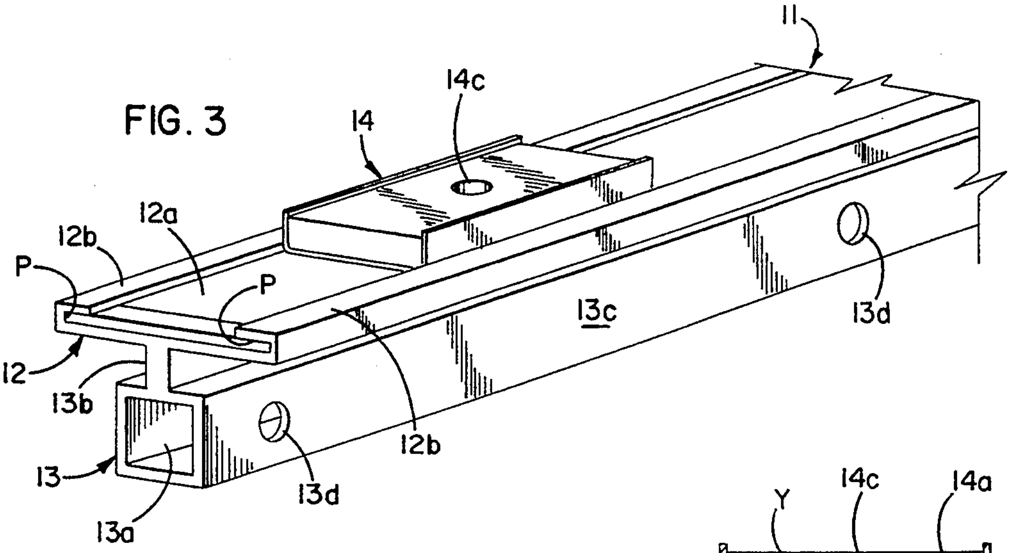
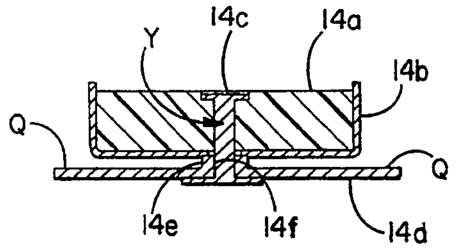
FIG. 5
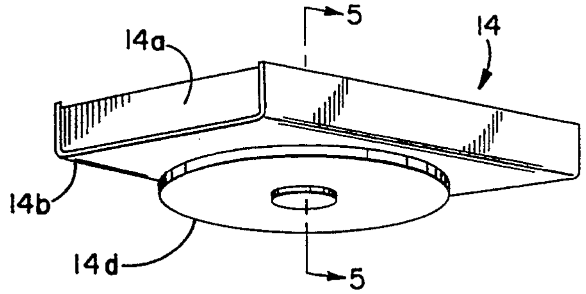
FIG. 4
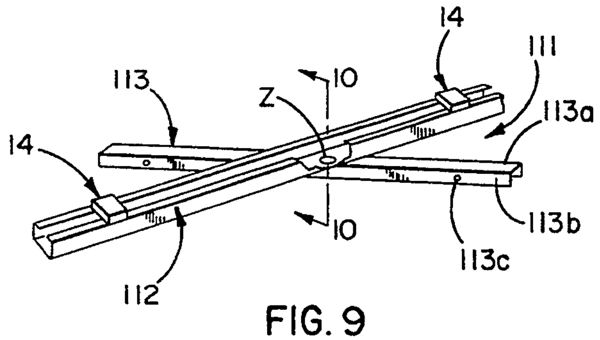
FIG. 9
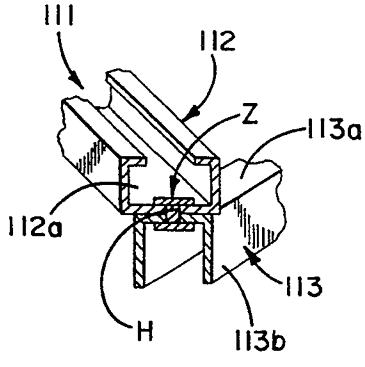
FIG. 10

SUSPENDED DISPLAY HOLDER

This is a continuation of copending application Ser. No. 07/839,574 filed on Feb. 21, 1992 now abandoned.

FIELD OF THE INVENTION

A suspended display holder for use in securing a display from a base, such as a ceiling grid, by magnetic attraction.

BACKGROUND OF THE INVENTION

In retailing establishments such as department stores, supermarkets, specialty stores and the like, the use of displays, such as signage, flags, mobiles and the like suspended from the ceiling, has been widely adopted as an effective means for stimulating sales. Various methods have heretofore been utilized for connecting the display to a ceiling; such methods commonly include adhesives, tapes, staples, screw-fasteners, spring clips and the like. These methods, however, are beset with one or more of the following shortcomings; a) they detract from the aesthetic appearance of the display; b) they are unreliable in retaining the display in a desired location; c) they deface the ceiling and/or the display itself; d) they can only support displays of limited size and weight; e) they involve an inordinate amount of manual labor; and f) they do not readily enable the display to be moved to various locations.

In lieu of such methods various kits have been utilized in the past for such purposes; however, these kits are expensive, include an inordinate number of component parts, some of which are fragile, they are awkward to assemble, and are not readily capable of accommodating displays which vary in size, shape and weight over a wide range.

SUMMARY OF THE INVENTION

Thus, a suspended display holder has been provided which avoids all of the aforenoted shortcomings of the prior art.

The improved display holder is of simple, inexpensive construction, may be readily assembled and disassembled, and does not require the talents of a skilled erector or dexterous person.

Further and additional advantages inherent in the improved display holder will become apparent from the description, accompanying drawings, and appended claims.

In accordance with one embodiment of the invention, a suspended display holder is provided for use in securing a display by magnetic attraction to a base, such as a metallic grid used in mounting ceiling acoustical tile and the like. The term "display" as used herein is intended to include, but not limited to, signs, flags, banners, pennants, graphics, mobiles, streamers, posters, plants, floral arrangements and the like. The holder is provided with an elongate support unit which subtends and is in close proximity to the base. Magnetic means is provided on the support unit for selective magnetic engagement with the base. Removably mounted on the support unit is a hanger means which includes removable elongate suspension means depending from the support unit, and a display-engaging member removably connected to the suspension means and extending angularly therefrom.

DESCRIPTION OF THE DRAWINGS

For a more complete understanding of the invention reference is made to the drawings wherein:

FIG. 3 is an enlarged fragmentary perspective view of the support unit and one of the magnet units shown in FIGS. 1 and 2

FIG. 4 is an enlarged perspective view of the magnet unit per se shown in FIG. 3.

FIG. 5 is a sectional view taken along line 5—5 of FIG. 4

FIG. 9 is a fragmentary perspective view on a reduced scale of a second embodiment of the support unit.

FIG. 10 is an enlarged fragmentary sectional view taken along line 10—10 of FIG. 9.

DESCRIPTION

Figure 1:
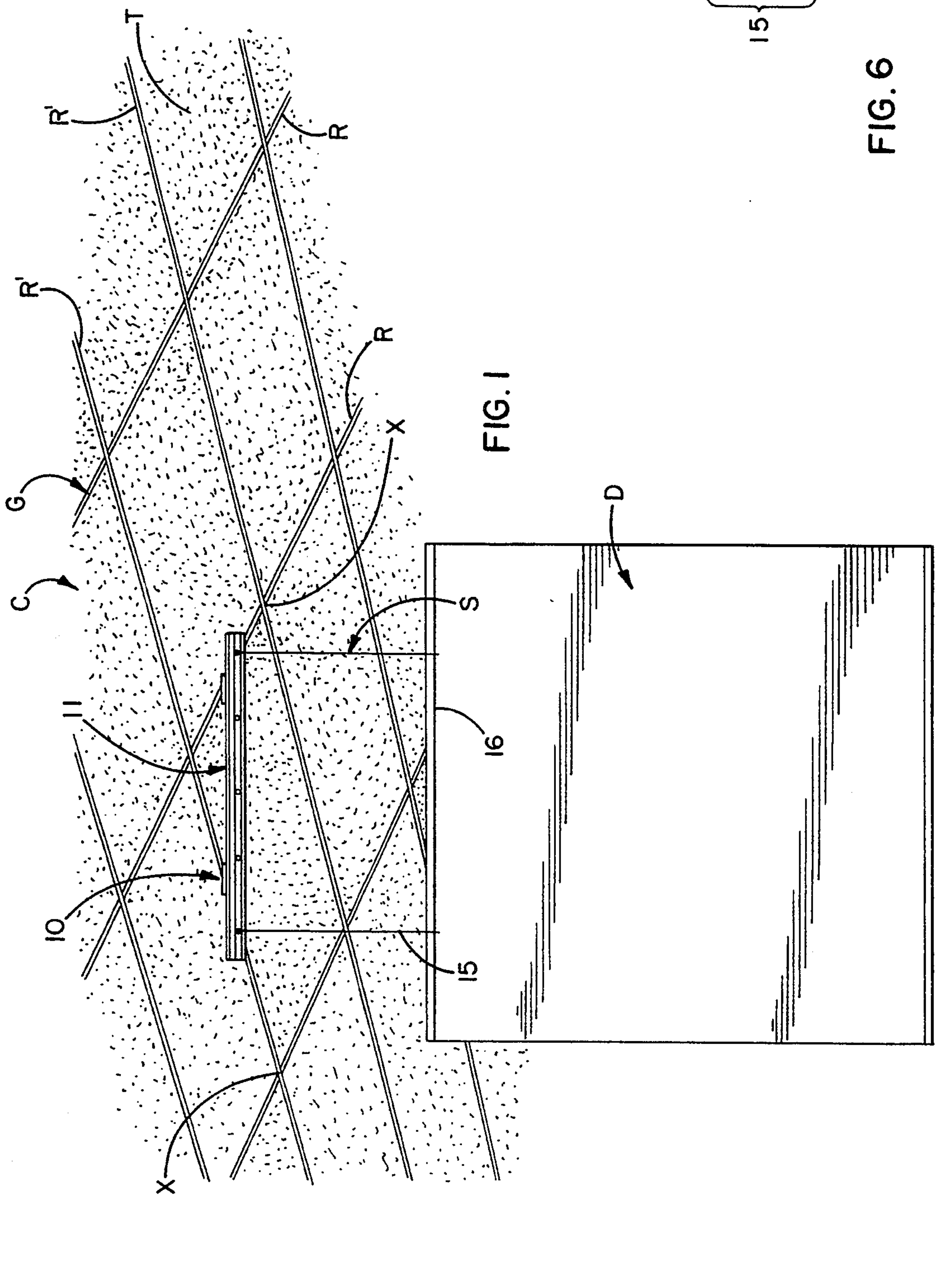
FIG. 1 is a fragmentary perspective view looking upward towards a suspended ceiling and showing a depending display secured to the ceiling grid by one embodiment of the improved display holder.

Referring now to the drawings and more particularly to FIG. 1 one embodiment of the improved holder 10 is shown in magnetic engagement with a metallic grid commonly utilized in the erection of suspended ceilings C in commercial establishments. The grid G normally includes sets of interconnected, elongate metallic runners R and R′ which are disposed in transverse relation and are adapted to provide edge support for acoustical tile or ceiling panels T in a manner well known by architects, building contractors and ceiling erectors. The arrangement of the grid runners depends on the peripheral shape of the tiles or panels to be supported thereby.

Holder 10 includes an elongate support unit 11 which may be extruded from a suitable plastic or metallic material. It is preferred that the length of unit 11 be greater than the spacing between adjacent runners of each set R, R′ so that, if desired, it can extend diagonally across the exposed lower surface of the ceiling tile T and interconnect opposed intersections X formed between runners R and R′.

As seen in FIG. 3, unit 11 may include a channel-shaped upper section 12 and a lower section 13. Section 12 has an elongate planar central portion **12*a* and pair of inverted L-shaped portions 12*b* extending upwardly from opposite side edges of the central portion. The portions 12*a* and 12*b*** cooperate with one another to form a guide-way, the function of which will be described more fully hereinafter.

The lower section 13 depends from the underside of central portion **12*a* and may take various forms, such as a single flange extending the full length of unit 11, or as shown in FIG. 3, a lower section which includes a hollow tubular lower portion 13*a* and a narrow upper portion 13*b*, the latter interconnecting lower portion 13*a* to the central portion 12*a* of the upper section 12. The opposed sidewalls 13*c*** of the hollow lower portion 13a may be provided with a plurality of longitudinally spaced holes 13d. The size, shape and number of holes formed in each sidewall 13c may vary from that shown. The lower section 13 of unit 11 provides reinforcement for the upper section 12.

A second embodiment of the support unit 111 is shown in FIGS. 9 and 10 wherein the channel-shaped upper section 112 and the lower section 113 are pivotally connected by a rivet Z. The shank of the rivet extends through aligned holes H formed in the central portion 112a of the upper section 112 and the bail portion 113a of the inverted channel-shaped lower section 113, see FIG. 10. The upper section 112 slidably accommodates one or more magnet unit 14. The depending flanges 113b of lower section 113 are provided with laterally aligned holes 113c for accommodating the upper end 15a of hanger 15.

Holder 10 also includes one or more, preferably a pair of magnet units 14 which are slidably mounted within the guideway formed in the upper section 12 of support unit 11. As seen in FIGS. 4 and 5, each magnet unit 14 may include a magnet section 14a which is disposed within a channel-shaped carrier 14b. Formed centrally of the magnet section 14a is a bore 14c, which may be counter-sunk at the upper end. The bore 14c is adapted to accommodate a rivet Y which in turn secures a follower piece 14d to the underside of carrier 14b. The follower piece may have an annular peripheral configuration and a thickness which allows the piece to slidably fit within the elongate pockets P formed at the opposite sides of the central portion 12a by the inverted L-shaped portions 12b, see FIG. 3. The pockets P and the upper surface of the central portion 12a cooperate with one another to form a guideway for the magnet units 14.

As seen in FIG. 5, piece 14d may be provided with an upwardly extending cylindrical spacer collar 14e having a central bore 14f which is aligned with the bore 14c formed in the magnet section 14a. The bores 14c and 14f are sized to accommodate the shank of the rivet Y.

To mount the magnet unit 14 on the support unit 11, the portions Q of the follower piece 14d, which project laterally beyond the exterior surfaces of the opposed sides of carrier 14b, are slidably inserted endwise into the pockets P at opposite sides of the central portion 12a of the upper section 12, see FIG. 3. Because of the annular periphery of follower piece 14d, the magnet section 14 may rotate 360° relative to the support unit 11, when the follower piece portions Q are slidably accommodated in the guideway. The number of magnet sections 14 mounted within the guideway of the support unit 11 will depend upon the length of the latter. The magnet sections 14 are independently adjustable relative to one another thereby allowing greater flexibility in positioning the support unit 11 relative to the grid runners R and R'.

Figure 6:
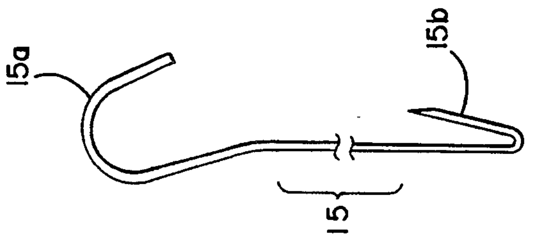
FIG. 6 is an enlarged elevational view of one suspension means, component shown in FIGS. 1 and 2.

The holder 10 includes suspension means S which may comprise a plurality of elongate hangers 15, one embodiment of which is shown in FIG. 6. Each hanger is preferably formed of relatively stiff metal wire and has a rounded hook 15a formed at one end and a J-shaped hook 15b at the opposite end. The end of hook 15b is preferably pointed thereby facilitating engagement of the hanger with a display-engaging member 16, as will be described more fully hereinafter. The rounded hook 15a may be readily inserted through a selected hole 13d in the sidewall of the unit lower section 13. The opposite hook 15b may be shaped so as to readily pierce either the display-engaging member 16 or the upper edge portion of the display D itself. The hangers may be formed of a variety of material other than metal wire, such as chord sections, chain or the like. When the hangers are formed of flexible material, the ends thereof should be in the form of substantially inflexible metal hook pieces or pins.

Figure 7:
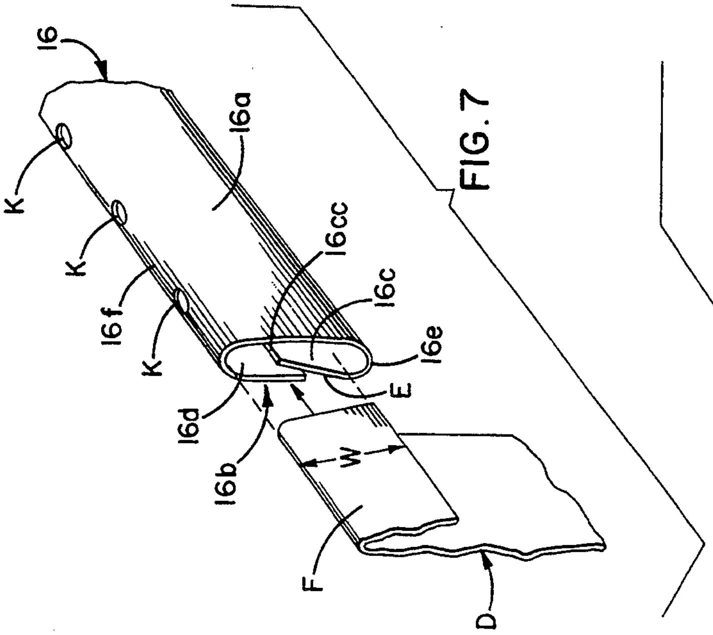
FIG. 7 is a fragmentary enlarged perspective end view of a display-engaging member and showing an upper edge of a display in disengaged relation with the member.

The display-engaging member 16, as seen in FIG. 7, may be extruded or otherwise formed of a suitable plastic or metal material and includes an elongate first sidewall 16a and a second sidewall 16b, the later being formed of a lower segment 16c and an overlapping upper segment 16d. The lower edge of the first sidewall 16a and the lower segment 16c are interconnected by a resilient first bail segment 16e. In a similar manner, the upper edge of sidewall 16a and the upper segment 16d are interconnected by a resilient second bail segment 16f. The width of the first bail segment 16e is greater than the width of the second bail segment 16f as noted in FIG. 7. If desired, the second bail segment 16f may be provided with a plurality of apertures K. It will be noted that the upper edge 16cc of the lower segment 16c is spaced a substantial distance from the underside of the second bail segment 16f.

When the display D is a sign, the latter is normally formed of relatively stiff sheet material and may have the upper edge of the sign folded back upon itself so as to form a resilient flap F. Because of the inherent fight back of the sign sheet material, the flap F will normally assume a downwardly and outwardly extending, angular position relative to the remainder of the sign. The width W of the flap F, measured normal to the foldline, is less than the spacing between the upper edge of the lower segment 16c and the underside of the second bail segment 16f. Thus, when the display panel is to be assembled with member 16, the folded upper edge of the sign is inserted upwardly through an elongate entry E formed in sidewall 16b causing the lower segment to be distorted inwardly and the upper segment to be distorted outwardly until the flap F clears the upper edge 16cc of the lower segment 16c. When clearance occurs, the flap will automatically resume its normal downwardly and outwardly extending position whereupon the flap F will be in interlocking relation with the lower segment 16c. In order to disengage the sign D from the display-engaging member 16, the sign is manually moved endwise relative to the member 16 until the sign is free of the member. A suitable cap or stop, not shown, may be removably mounted on opposite ends of the member 16 to prevent accidental disengagement of the sign or other display from the member.

Figure 8:
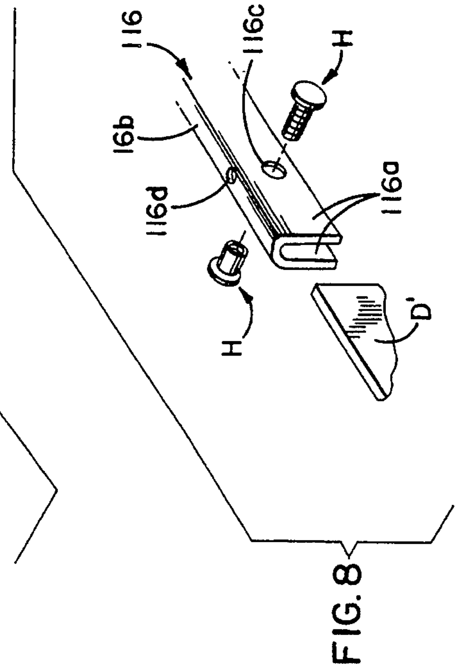
FIG. 8 is similar to FIG. 7 but showing a second embodiment of a display-engaging member.

A modified form of a display-engaging member 116 is shown in FIG. 8 wherein the upper edge of the sign does not require a folded flap. Member 116 has an inverted channel configuration and includes depending flanges 116a interconnected by a bail section 116b which cooperate with one another to snugly straddle the non-folded upper edge of the sign D'. The flanges 116a may be provided with a plurality of apertures 116c arranged in longitudinally spaced relation. Corresponding apertures are laterally aligned and sized to readily accommodate the shank of a conventional fastener H. A plurality of longitudinally spaced apertures 116d may also be formed in bail 116b. The apertures 116d are adapted to accommodate the tip of the J-shaped hook end 15b of hanger 15.

Figure 2:
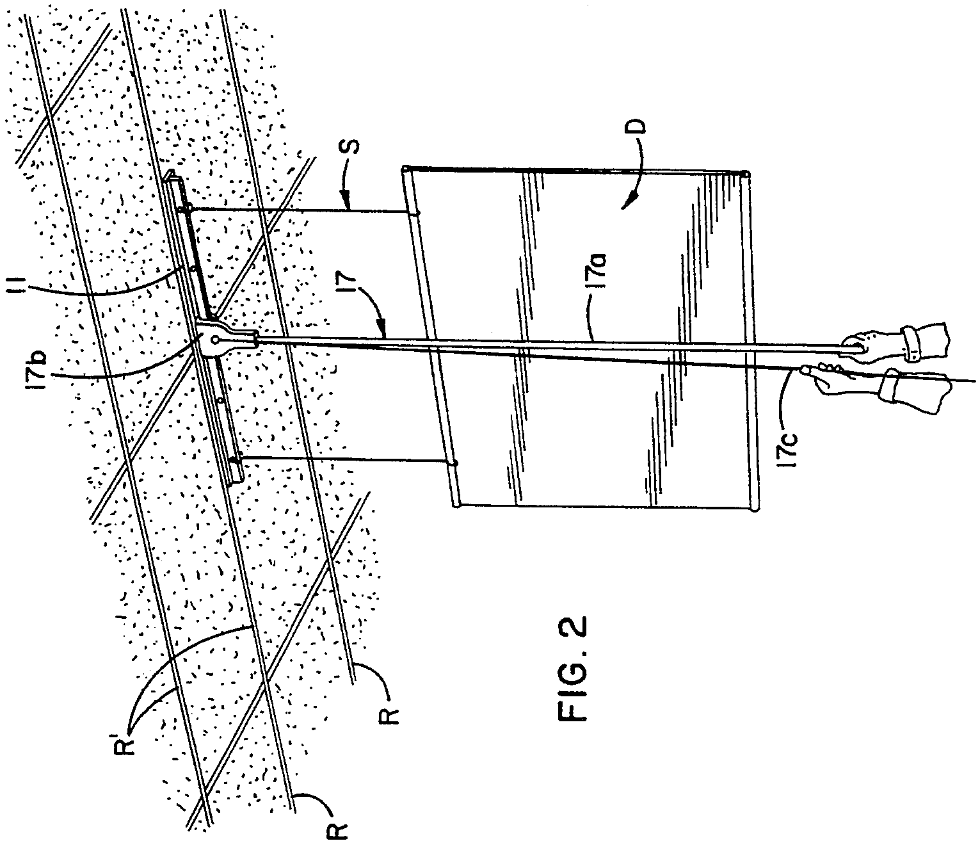
FIG. 2 is similar to FIG. 1 but showing the holder of FIG. 1 being manually secured to the ceiling grid.

The mounting of the holder 10 and attached display D may be readily performed in a facile and expeditious manner by an individual when utilizing a pole-like tool 17 as seen in FIG. 2. The tool may include an extensible shaft 17*a*, a manually actuated gripper head 17*b* affixed to the upper end of the shaft, and a flexible control chord 17*c* which is connected at one end to the head 17*b* and controls one of a pair of gripper jaws to effect movement thereof to a release mode. The gripper jaws which comprise the head 17*b* are angularly offset relative to the axis of shaft 17*a* to facilitate gripping of the support unit 11 by the gripper head. Because of the inflexibility of the support unit 11, the latter may be readily manipulated by the tool 17 so that the magnet units 14 disposed within the guideway of the support unit are brought into proper alignment with the selected ceiling grid runners R and R'. The capability of the magnet sections 14*a* to rotate relative to the guideway, allows the support unit 11 to be readily disposed in an in-line or angular position with respect to one or more grid runners R, R'. Thus, the suspended display D may be located in a selected area of the ceiling which is in the vicinity of where a particular sales or promotional activity is to occur within the store.

To take down, or relocate, the holder 10 relative to the ceiling grid, merely requires a person to manipulate the tool 17 so that head 17*b* thereof is brought into gripping engagement with the support unit lower section 13. The gripping head 17*b* is then tilted causing the support unit 11 to twist about its longitudinal axis breaking the magnetic engagement between the magnet section 14 and the grid runners R and R'.

Before the holder 10 is mounted on the ceiling runners, corresponding one ends 15*a* of the hangers 15 are connected to the lower section 13 of the support unit 11, and the opposite corresponding ends 15*b* of the hangers are connected to the display-engaging member 16 or 116. The support unit, magnet units, hangers, display-engaging member and the display itself are light-weight thereby enabling an individual possessed of normal strength and dexterity to readily mount the holder 10 and display D with the single tool 17 as shown in FIG. 2.

While holder 10 has been described in relation to a sign type display, it should be noted that the holder maybe readily used with other types of displays. For example, where the display is a floral hanging basket, a single hanger may be utilized which might hook onto the basket handle thereby eliminating the need for member 16 or 116. Where, however, the basket has a rectangular configuration, two or more hangers might be required, which directly engage the basket or a handle therefor, so that the basket maintains a balanced horizontal position. Where the display is a mobile, a single hanger without member 16 or 116 may be utilized wherein the lower end of the hanger is directly connected to the mobile.

The shape, size and color of the holder components may vary from that shown so as to complement the aesthetics of the display and the interior decor of the room or space in which the holder is located.

Thus, an improved holder has been disclosed which is simple, light-weight and of inexpensive construction, is capable of being used with a wide variety of displays, and can be readily assembled, disassembled or relocated relative to the metallic ceiling grid utilized in commercial establishments. The holder may be readily assembled, disassembled, or relocated relative to a ceiling grid by an individual without the need for a ladder, step-stool or the like.

I claim:

1. A suspended display holder for securing a display to a base with magnetic attraction, comprising an elongate support unit adapted to subtend the base, magnetic means mounted for longitudinal adjustment on said support unit for magnetic engagement with first portions of the base when said support unit is oriented in a first position and for magnetic engagement with second portions of the base when said support unit is oriented in a second position to enable angular adjustment of said support unit relative to the first and second portions of the base, and movable hanger means mounted on selective portions of said support unit; said hanger means including elongate suspension means having an end portion connected to and depending from said support unit and adapted to be in supporting releasable engagement with the display.

2. The holder of claim 1 wherein the support unit is substantially inflexible and is adapted to be disposed in close proximity to an exposed surface of the base.

3. The holder of claim 2 wherein the support unit includes a first section having an elongate guideway formed therein in which said magnetic means is slidably disposed, and a second section subtending said first section, said second section being removably engaged by the end portion of said suspension means.

4. The holder of claim 3 wherein the laterally spaced magnetic means includes at least a pair of magnetic units independently adjustable along the first section guideway.

5. The holder of claim 1 wherein the suspension means includes at least one removable elongate hanger, the latter having an upper first end portion selectively connected to selected portions of the support unit and a lower second end portion, and an elongate display-engaging member removably connected to and extending laterally from said hanger second end portion.

6. The holder of claim 5 wherein the support unit and a display-engaging member are disposed in spaced, substantially parallel axes defined thereby.

7. A suspended display holder for securing a display to a base with magnetic attraction, comprising an elongate support unit adapted to subtend the base, magnetic means provided on said support unit for magnetic engagement with selected portions of the base, and removable hanger means mounted on selected portions of said support unit; said hanger means including elongate suspension means depending from said support unit and adapted to be in supporting releasable engagement with the display; said support unit including a first section having an elongate guideway formed therein in which said magnet means is slidably disposed, and a second section pivotally connected to and subtending said first section and being selectively movable about an axis substantially perpendicular to a longitudinal axis of the guideway, said second section being removably engaged by the end portion of said suspension means.

8. A suspended display holder for securing a display to a base having elongate first grid members and elongate second grid members disposed in transverse relation comprising an elongate support unit adapted to subtend the base, first and second magnetic elements being rotatable about an axis substantially transverse to a longitudinal axis of said support unit and being longitudinally adjustable on said support unit for magnetic engagement with at least one of the first grid members and at least one of the second grid members, respectively, to permit orientation of the support unit in angular relation with respect thereto, and a hanger mounted on said support unit and depending from said support unit in supporting engagement with the display.

9. A suspended display holder for securing a display to a base with magnetic attraction, comprising an elongate, substantially inflexible support unit adapted to subtend the base in close proximity to an exposed surface of the base, the support unit including a first section having an elongate guideway formed therein, and a second section subtending said first section, magnetic means slidably disposed in the guideway and being rotatable relative to the guideway about an axis substantially transverse to a longitudinal axis of the guideway for magnetic engagement with first portions of the base when said support unit is oriented in a first position and for magnetic engagement with second portions of the base when said support unit is oriented in a second position to enable angular adjustment of said support unit, and movable hanger means mounted on selective portions of said support unit, said hanger means including elongate suspension means having an end portion connected to and depending from said support unit and adapted to be in supporting releasable engagement with the display, said second section of the support unit being removably engaged by the end portion of said suspension means.

* * * * *